US011694442B2

(12) United States Patent
Zhang et al.

(10) Patent No.: US 11,694,442 B2
(45) Date of Patent: Jul. 4, 2023

(54) SYSTEMS AND METHODS FOR COUNTING REPETITIVE ACTIVITY IN AUDIO VIDEO CONTENT

(71) Applicant: Inception Institute of Artificial Intelligence Ltd, Abu Dhabi (AE)

(72) Inventors: Yunhua Zhang, Amsterdam (NL); Cees G. M. Snoek, Amsterdam (NL); Ling Shao, Masdar (AE)

(73) Assignee: Inception Institute of Artificial Intelligence Ltd, Abu Dhabi (AE)

( * ) Notice: Subject to any disclaimer, the term of this patent is extended or adjusted under 35 U.S.C. 154(b) by 164 days.

(21) Appl. No.: 17/351,608

(22) Filed: Jun. 18, 2021

(65) Prior Publication Data
US 2022/0156501 A1 May 19, 2022

Related U.S. Application Data

(60) Provisional application No. 63/113,288, filed on Nov. 13, 2020.

(51) Int. Cl.
*G06K 9/00* (2022.01)
*G06V 20/40* (2022.01)
*G10L 25/57* (2013.01)
*G06N 3/04* (2023.01)
*G06N 3/08* (2023.01)

(52) U.S. Cl.
CPC ............. *G06V 20/46* (2022.01); *G06N 3/04* (2013.01); *G06N 3/08* (2013.01); *G06V 20/41* (2022.01); *G10L 25/57* (2013.01); *G06V 20/44* (2022.01)

(58) Field of Classification Search
CPC ........ G06V 20/46; G06V 20/41; G06V 20/44; G06V 10/803; G06V 10/82; G06N 3/04; G06N 3/08; G06N 3/045; G10L 25/57; G10L 25/30
See application file for complete search history.

(56) References Cited

U.S. PATENT DOCUMENTS 11,249,756 B2 * 2/2022 Kang ..................... G06N 3/08
11,341,185 B1 * 5/2022 Hamid .................... G10L 25/57

OTHER PUBLICATIONS

Debidatta Dwibedi, Counting out time: Class Agnostic video repetition counting in the wild (Year: 2020).*

* cited by examiner

*Primary Examiner* — Dhaval V Patel
(74) *Attorney, Agent, or Firm* — Stetina Brunda Garred and Brucker

(57) ABSTRACT

Repetitive activities can be captured in audio video content. The AV content can be processed in order to predict the number of repetitive activities present in the AV content. The accuracy of the predicted number may be improved, especially for AV content with challenging conditions, by basing the predictions on both the audio and video portions of the AV content.

21 Claims, 6 Drawing Sheets

SYSTEMS AND METHODS FOR COUNTING REPETITIVE ACTIVITY IN AUDIO VIDEO CONTENT

RELATED APPLICATIONS

The current application claims priority to U.S. provisional application 63/113,288 filed Nov. 13, 2020, the entire contents of which are incorporated herein by reference for all purposes.

TECHNICAL FIELD

The current disclosure relates to automated processing of audio video content and in particular to processing audio video content to count occurrences of repetitive activity present in the audio video content.

BACKGROUND

A challenging problem is automatically counting repetitions of activities in a video, which may not be known beforehand, such as bouncing on a trampoline, slicing an onion or playing ping pong. Computer vision solutions to this challenging problem have a long tradition. Early work emphasized on repetitive motion estimation by Fourier analysis and more recently by a continuous wavelet transform. Current state-of-the-art solutions rely on convolutional neural networks and large-scale count-annotated datasets, such as those described in "Counting out time: Class agnostic video repetition counting in the wild", CVPR, 2020, of Debidatta Dwibedi, Yusuf Aytar, Jonathan Tompson, Pierre Sermanet, and Andrew Zisserman (referred to as Dwibedi et al.) and in "The sound of motions" ICCV, 2019 of Hang Zhao, Chuang Gan, Wei-Chiu Ma, and Antonio Tor-ralba (referred to as Zhang et al.), to learn to predict the number of repetitions in a video. Albeit successful, vision-based repetition counting may fail in poor sight conditions such as low illumination, occlusion, camera view changes, etc.

Existing approaches for repetition estimation in video rely on visual content only. Early works compress the motion field of video into one-dimensional signals and count repetitive activities by Fourier analysis, peak detection or singular value decomposition. Other techniques have proposed a spatiotemporal filter bank, which works online but needs manual adjustment. Still other techniques design a classification network able to learn from synthetic data, where the network is designed to extract features from an input video with a predefined sampling-rate, which cannot handle repetitions with various period lengths. The synthetic dataset is also less suitable usage in the wild. All of the above techniques assume that the repetitions are periodic, so they can cope with stationary situations only.

Recently, algorithms for non-stationary repetitive action counting have been proposed, which leverage the wavelet transform based on the flow field and collect a dataset containing 100 videos including non-stationary repetitions, but the videos do not contain an audio track. Zhang et al. propose a context-aware framework based on a 3D convolution network, and introduce a new activity repetition counting dataset based on UCF101. While effective, the temporal length of every two repetitions is predicted by an iterative refinement, which makes the approach less appealing from a computational perspective. Concurrently, Dwibedi et al. collect a large-scale dataset from YouTube, named Countix, containing more than 6,000 videos and their activity repetition counts. The approach of Dwibedi et al. utilizes temporal self-similarity between video frames for repetition estimation. It chooses the frame rate for sampling the input video by picking the one with the maximum periodicity classification score. While appealing, such a rate selection scheme is not optimal for accurate counting, as it is prone to select high frame rates leading to omissions.

An additional, alternative and/or improved technique for automatically counting repetitive activities present in audio video content is desirable.

SUMMARY

In accordance with the present disclosure there is provided a method for predicting a number of repetitions in an audio/video (AV) content comprising: extracting video features from a video portion of the AV content; extracting audio features from an audio portion of the AV content; processing at least a portion of the extracted video features and a portion of the extracted audio features to determine a temporal stride for use in processing the video portion of the AV content; processing the extracted video features with a neural network to predict a number of repetitive actions in the video portion; processing the extracted audio features with a neural network to predict a number of repetitive actions in the audio portion predicting a final number of repetitive actions from the predictions of the number of repetitive actions in the video portion and audio portion and the extracted video and audio features.

In a further embodiment of the method, the video portion of the AV content comprises a video clip from the AV content, and the audio portion of the AV content comprises a spectrogram of the AV content.

In a further embodiment of the method, the audio features are extracted using a 2D residual neural network.

In a further embodiment of the method, the residual neural network comprises at least 18 layers.

In a further embodiment of the method, the audio features are extracted using a 3D residual neural network.

In a further embodiment of the method, the neural network used to process the extracted video features comprises at least one fully connected layer.

In a further embodiment of the method, the neural network used to process the extracted video features comprises: a first fully connected layer outputting a repetition count of each of a plurality of repetition classes present in the video portion of the AV content; and a second fully connected layer classifying the plurality of repetition classes present in the video portion of the AV content.

In a further embodiment of the method, the neural network used to process the extracted audio features comprises at least one fully connected layer.

In a further embodiment of the method, the neural network used to process the extracted audio features comprises: a first fully connected layer outputting a repetition count of each of a plurality of repetition classes present in the audio portion of the AV content; and a second fully connected layer classifying the plurality of repetition classes present in the audio portion of the AV content.

In a further embodiment of the method, predicting the final number of repetitive actions comprises a residual block processing extracted audio features and a fully connected layer processing features output from the residual block and video features.

In accordance with the present disclosure there is further provided a non-transitory computer readable memory storing instructions, which when executed by a processor of a system configure the system to perform a method as described above.

In accordance with the present disclosure there is further system comprising: a processor for executing instructions; and a memory storing instructions, which when executed by the processor configure the system to perform a method as described above.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
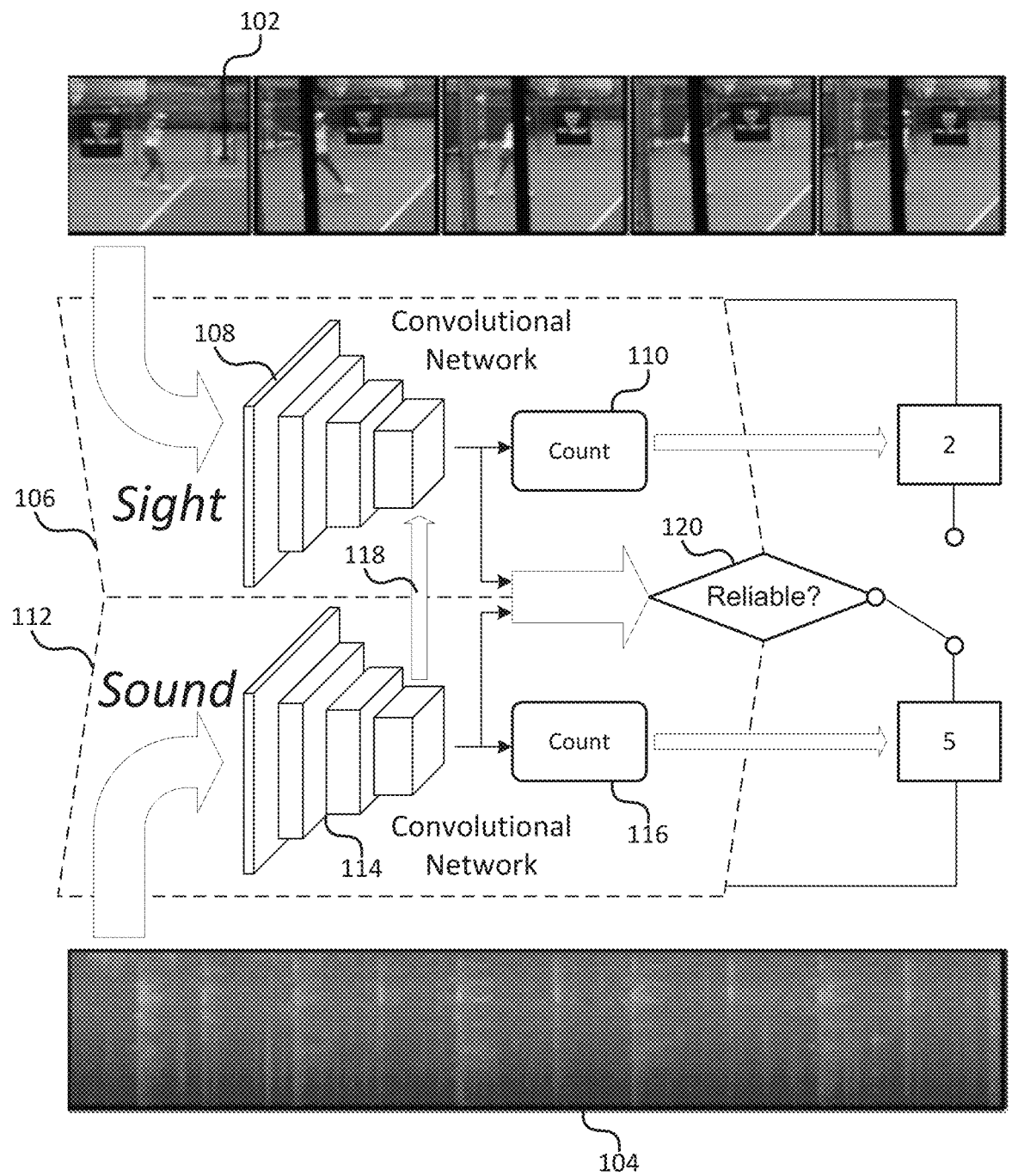
FIG. 1 depicts a proves for automatic counting of repetitive activities using both audio and video.

A repetitive activity such as jumping on a trampoline, chopping onions, playing ping pong, shoveling, etc. can be captured in both audio and video. The audio and video may be processed to automatically predict the number of repetitions of the activity. The same system can be used to count or predict the number of repetitions present in audio video content for any type of repetitive activity. In contrast to current computer vision approaches, which analyze the visual video content only, the current system incorporates the corresponding sound into the repetition counting process. This benefits accuracy in challenging vision conditions such as occlusion, dramatic camera view changes, low resolution, etc. A model is described that first analyzes the sight and sound streams separately. Then an audiovisual temporal stride decision module and a reliability estimation module are introduced to exploit cross-modal temporal interaction.

For learning and evaluation, an existing dataset is repurposed and reorganized to allow for repetition counting with both sight and sound. A variant of this dataset is also introduced for repetition counting under challenging vision conditions. Experiments demonstrate the benefit of sound, as well as the other introduced modules, for repetition counting, especially under harsh vision conditions. The trained sight-only model described herein already out performs the state-of-the-art techniques by itself, and results improve further when sound is incorporated into the process.

A goal of the systems and methods described herein is to count the repetitions of activities, which may be unknown, like bouncing on a trampoline, slicing an onion or playing ping pong that have been captured on video along with audio. Analyzing sound has recently proven advantageous in a variety of computer vision challenges, such as action localization by previewing the audio track, and self-supervised representation learning by video and audio synchronization. Correspondingly, a series of mechanisms for fusing both the video and audio modalities have been developed.

Previous approaches have trained an audio network independently and used its output to guide the inference process of a visual counterpart. Other techniques have adopted feature multiplication or concatenation of both modalities, and have used a single fully connected layer to output their final prediction.

The current systems and methods also combine sight and sound modalities but recognizes that for some activities, like playing ping pong or other repetitive activities, it is possible to count the number of repetitions by just listening. This suggests that sound may be an important cue by itself. Hence, the implementation of the intelligent repetition counting system described further below is able to judge when the sight condition is poor and therefore utilize complementary information from sound.

The current disclosure provides a system and method for implementing counting the repetitions of possibly unknown activities captured in audio video content using both sight and sound. Additionally, an audio/visual model implementation is provided using a network architecture with a sight and sound stream, where each network facilitates the prediction of the number of repetitions from each modality. As the repetition cycle lengths may vary in different videos, a temporal stride decision module is provided to select the best sample rate for each video based on both audio and visual features. The system may further include a reliability estimation module that exploits cross-modal temporal interaction to decide which modality-specific prediction is more reliable.

Two sight and sound datasets were derived from the Countix and VGGsound dataset. One of the datasets is for supervised learning and evaluation and the other for assessing audio/visual counting in challenging vision conditions. Finally, experiments using the described system and method demonstrate the benefit of sound, as well as the other introduced network modules, for repetition counting, especially under harsh vision conditions.

The automatic counting of repetitive activities captured in video content comprising both a sight and sound portion described herein uses both the sight and sound in predicting the number of repetitions. The described network includes a temporal stride decision module that is able to determine a suitable frame rate for counting, based on features from both modalities, i.e. sight and sound. To facilitate the development of the system, the Countix dataset is reorganized and supplemented to arrive at two audio visual datasets for repetitive activity counting by sight and sound.

Previous techniques have demonstrated the benefit of audio signals for various computer vision challenges, e.g. action localization, audiovisual event localization and self-supervised learning. As processing audio signals is much faster than frames of videos, previous techniques have reduced the computational cost by previewing the audio track for video analysis, while the audio and visual models work independently. Recent talking-face generation works exploit sound for creating photo-realistic videos. These precious applications have used audio features to generate expression parameters and to map the audio to lip movements.

Other previous audio/video processing techniques have considered the interaction between both modalities using various fusion schemes. Some simply integrate features by concatenation for saliency detection and self-supervised learning. Other techniques have combined multi-modal predictions by averaging or training a single fully connected layer independently, which takes multi-modal features as inputs, for egocentric action recognition. Video captioning approaches, typically design cross-modal attention mechanisms to dynamically select modality-specific features when generating each word in a sentence. Works for sound source localization and separation also commonly generate cross-modal attention maps. Other audio video processing techniques have formulated the problem of audiovisual video parsing using a hybrid attention network, which updates the features of one modality by the other, to classify each video segment into audible, visible or both. Still other audio video processing techniques have used audio features to modulate the visual counterpart for more accurate crowd counting.

While audio has been used in coordination with video for various processing tasks, the use of both audio and video for automatically counting repetitive activities has not previously been used. To cope with various 'in the wild' conditions, a novel scheme to explicitly estimate the reliability of the predictions from sight and sound is described further below.

FIG. 1 depicts a processing model using both audio and video content to automatically count repetitive activities. The model 100 can process a video, containing a visual stream 102 and its corresponding audio stream 104 to count the number of repetitions of possibly unknown activities happening in the content. To achieve this, the model 100 comprises four modules. A sight stream module 106 that adopts a 3D convolutional network 108 as the backbone. It takes video clips as inputs and outputs the counting result 110 for each clip. A sound stream module 112, adopts a 2D convolutional network 114, which takes a sound spectrogram 104 generated by a short-time Fourier transform as input and outputs the counting result 116 in a similar manner as the sight stream convolutional network 108. A temporal stride decision module is designed to select the best temporal stride per video for the sight stream based on both visual and audio features, which is depicted schematically as arrow 118 in FIG. 1. A reliability estimation module 120 decides what prediction between the video stream count 110 and the audio stream count 116 to use.

Figure 2:
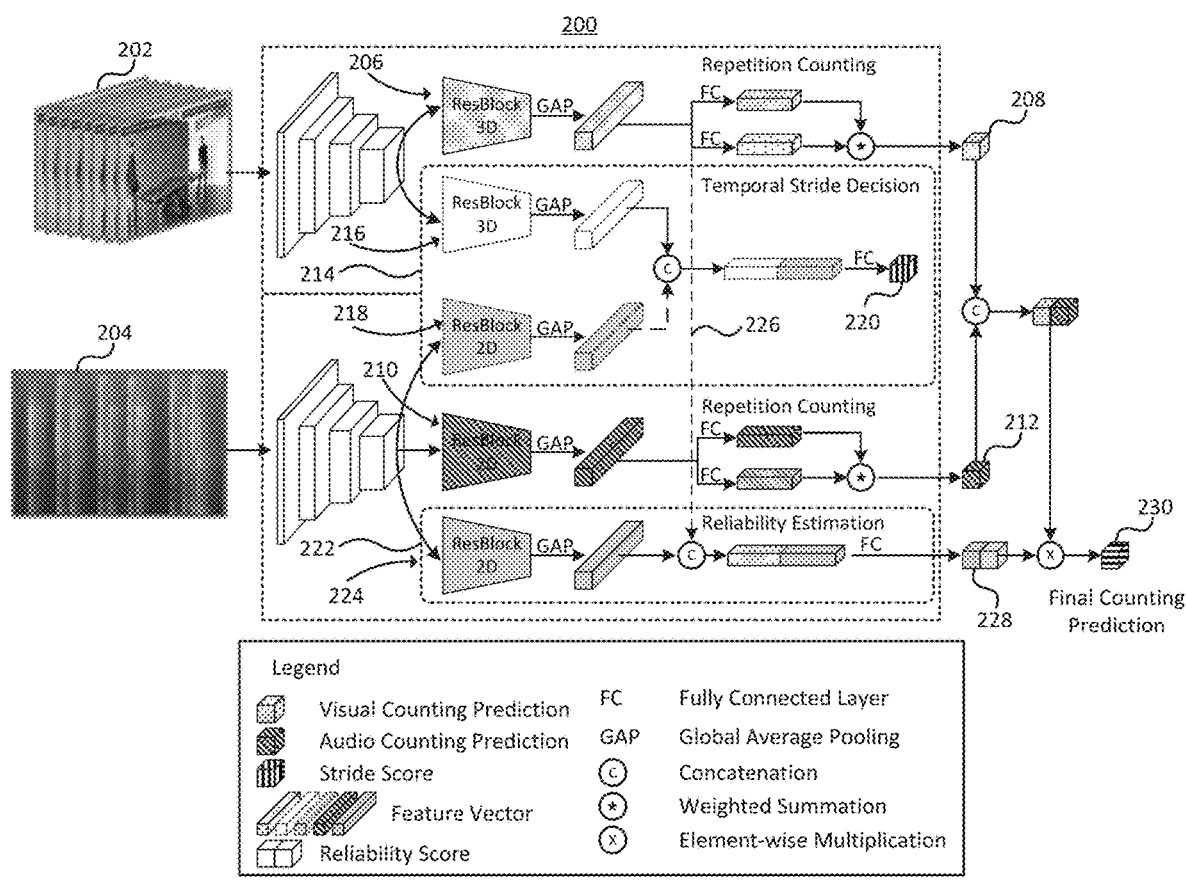
FIG. 2 depicts details of a model for automatic counting of repetitive activities using both audio and video.

FIG. 2 provides a detailed implementation of a model 200 based on the repetitive activity counting model 100. The model 200 is described in further detail below. The model processes video content comprising video or sight portions 202 and audio or sound portions 204.

Repetition Counting in Sight

The model 200 includes a sight stream 206 for counting repetitions based on the sight portions 202. The sight stream uses a separable 3D CNN (S3D) architecture with the final classification layer replaced by two separate fully connected layers, as shown in FIG. 2. Given a video clip $V_i$ of size T×H×W×3, visual features may extracted with the following equation:

$$v_{i,feat}=V_{CNN}(V_i) \quad (1)$$

where $v_{i,feat} \in \mathbb{R}^{512}$.

A single fully connected layer with one output unit could suffice to output the counting result. However, a single fully connected layer may lead to inferior repetition counts since different types of movements should not be counted in the same way, and each action class cannot be simply regarded as one unique repetition class. For example, different videos of doing aerobics contain various repetitive motions, while videos belonging to different action classes may contain similar movements, such as bouncing on a bouncy castle or a trampoline. Therefore, in the current technique, two fully connected layers work in tandem, with one $f_v^1$ outputting the counting result of each repetition class and the other one $f_v^2$ classifying which repetition class the input belongs to:

$$C'_{i,v}=f_v^1(v_{i,feat}), C'_{i,v} \in \mathbb{R}^P,$$

$$T_{i,v}=\text{softmax}(f_v^2(v_{i,feat})), T_{i,v} \in \mathbb{R}^P, \quad (2)$$

where P is the number of repetition classes, $C'_{i,v}$ is the counting result of each class, and $T_{i,v}$ is the classification result by the softmax operation. As the network learns to classify the inputs into different repetition classes automatically during training, P is a hyperparameter in the current model. Then the final counting result $C_{i,v}$ from the visual content 208 is obtained by:

$$C'_{i,v}=\Sigma_{k=1}^P C'_{i,v}(k) T_{i,v}(k), \quad (3)$$

For training the repetition counting, a loss function may be defined as follows:

$$L_c = \frac{1}{N}\sum_{i=1}^N L_2(C_{i,v}, l_{i,v}) + \lambda_1^v \frac{|C_{i,v} - l_{i,v}|}{l_{i,v}}, \quad (4)$$

where N is the batch size. $L_2$ is the L2 loss, $l_{i,v}$ is the groundtruth count label of the $i^{th}$ sample, $\lambda_1^v$ is a hyperparameter for the second term. Note that when using the L2 loss only, the model tends to predict samples with counts of large values accurately due to higher losses, while for videos with a few repetitions, the predicted counts tend to be unreliable. Therefore, a second term may be added here to let the model pay more attention to such data.

In addition, it is expected that the output units of $f_v^2$ will focus on different repetition classes. However, without constraint, $f_v^2$ could simply output a high response through the same unit. To avoid such degenerated cases, a diversity loss may be added based on the cosine similarity:

$$L_{i,v}^{div} = \sum_{q=1}^{P-1}\sum_{j=q+1}^{P} \frac{T_{i,v}^q \cdot T_{i,v}^j}{\|T_{i,v}^q\|\|T_{i,v}^j\|}, \quad (5)$$

where $T_v^q$ and $T_v^j$, are the $q^{th}$ and $j^{th}$ units of the classification outputs. By minimizing such a diversity loss, the output $T_v$ in the same batch are encouraged to produce different activations on different types of repetitive motions. Then the total loss function is:

$$L_v = \frac{1}{N}\sum_{i=1}^N L_2(C_{i,v}, l_{i,v}) + \lambda_1^v \frac{|C_{i,v} - l_{i,v}|}{l_{i,v}} + \lambda_2^v L_{i,v}^{div}, \quad (6)$$

where $\lambda_v^2$ is a hyperparameter.

Repetition Counting by Sound

In addition to the sight stream counting 206, the model further includes a sound stream for counting the repetitions 210 that adopts a ResNet-18 as the backbone. The raw audio clip may be transformed into a spectrogram 204 and then divided into a series of 257×500 spectrograms, which become the inputs to the sound stream network. Similar to the sight stream 206, the final classification layer of the sound stream 210 may be replaced by two separate fully connected layers, with one classifying the input and the other one outputting the corresponding counting result of each repetition class. The same loss function as the sight stream may be used:

$$L_a = \frac{1}{N}\sum_{i=1}^{N} L_2(C_{i,a}, l_{i,a}) + \lambda_1^a \frac{|C_{i,a} - l_{i,a}|}{l_{i,a}} + \lambda_2^a L_{i,a}^{div}, \quad (7)$$

where $C_{i,a}$ and $l_{i,a}$ are the counting result 212 from the audio track and groundtruth, and and $\lambda_2^a$ are hyperparameters.

Temporal Stride Decision

Repetitions may have various period lengths for different videos. For the sound stream 210, it is possible to simply resize the spectrogram 204 along the time dimension to ensure that each 257×500 segment has at least two repetitions. However, for the sight stream 206, it is not possible to roughly resize the video frames along the time dimension. Therefore, for each video, a specific temporal stride (i.e. frame rate) may be used to form video clips as the inputs. The temporal stride used may be important as video clips with small temporal strides may fail to include at least two repetitions, while too large temporal strides lead the network to ignore some repetitions. Therefore, an additional temporal stride decision module 214 may be used to determine the best temporal stride for each video. The temporal stride decision module 214 has two parallel residual blocks 216, 218, processing visual and audio features from the third residual block of the two streams, with the same structure as those of the respective backbones. Then the output features may be concatenated (as shown in FIG. 2) and sent into a fully connected layer, which outputs a single unit 220 representing the score of the current temporal stride. A max-margin ranking loss for training this module may be used:

$$L = \frac{1}{N}\sum_{i=1}^{N} \max(0, s_i^- - s_i^+ + m), \quad (8)$$

where m is the margin, $s_i^-$ and $s_i^+$ are the scores from negative and positive temporal strides. During evaluation, a series of clips is sent from the same video with different strides into the network, and select the stride with the highest score.

For each training video, the trained visual model predicts the counting result with a series of temporal strides, i.e. s=1, . . . , $S_k$, . . . , $S_K$, where $S_K$ is the maximum temporal stride. Then it is possible to obtain a series of corresponding predictions $C_{i,v}^1$, . . . , $C_{i,v}^{S_K}$. First, the temporal strides are selected that cover less than two repetitions as negative strides. Then, from the remaining strides, the smallest stride is chosen that is enough to contain at least two repetitions as the positive temporal stride S*. Correspondingly, the deviations from the prediction of the positive stride regarding those of the remaining strides are quantitatively computed in the following way:

$$\delta_n = \frac{C_{i,v}^{S*} - C_{i,v}^k}{C_{i,v}^{S*}}, \quad (9)$$

where $C_{i,v}^k$ is the counting prediction of a selected stride $C_{i,v}^{S*}$; is the counting prediction of the best stride, and $\delta_n$ is the computed deviation.

Finally, strides are selected with $\delta_n > \theta_s$ ($\theta_s$ is a predefined threshold) as negative strides, since for these strides, the network begins to omit certain repetitions. During training, for each video, its S* is used to form a positive video clip, while one is randomly selected from the negative strides to generate the negative clip.

Reliability Estimation

Depending on the sensory video recording conditions, the reliability of the sight and sound predictions 208, 212 may vary. To compensate for this variability, a reliability estimation module 222 may be introduced to decide what prediction from which modality is more reliable for the current input. As shown in FIG. 2, the reliability estimation module includes one residual block 224 for processing the audio feature and one fully connected layer taking features from both modalities, with the features from the sight stream depicted by the broken arrow 226, as inputs. The output is a single unit 228 processed by a sigmoid function and represents the confidence γ of the audio modality. Correspondingly, the confidence of the visual modality is 1−γ. Then the final counting result 230 is obtained by:

$$C_i = C_{i,v}^*(1-\gamma) + C_i, a^*\gamma. \quad (10)$$

As $C_i$ is expected to be close to the groundtruth counting label, the loss function used for training is:

$$L_r = \frac{1}{N}\sum_{i=1}^{N} \frac{|C_i - l_i|}{l_i}, \quad (11)$$

where $l_i$ is the ground truth counting label.

One simple approach to learn this module is to directly use the predictions from the trained models of both modalities on training videos as $C_{i,v}$ and $C_{i,a}$ in Eq. 10. However, it is empirically observed that such a manner suffers from severe over-fitting. Instead, the information existing in the training process is utilized to predict the reliabilities of the trained models for the different modalities. To be specific, consider the procedure of the visual model as an example. First, after each epoch during training, the predictions are obtained of the visual model on both the training and validation videos. Then, the average loss is calculated by Eq. 11 on the validation set of each epoch and reserve predictions of those epochs, in which the average loss is below a threshold $\theta_r^2$. Finally, for each training video, the average prediction (i.e. empirical prediction) of all preserved predictions can be calculated, denoted as $C'_{i,v}$ and the empirical prediction $C'_{i,a}$ of the sound stream is obtained in the same way, with a threshold $\theta_r^a$ for the average loss. As a result, with the reliability estimation module for late fusion, models for different modalities can be trained separately to achieve their best unimodal performance and combined effectively.

Figure 3:
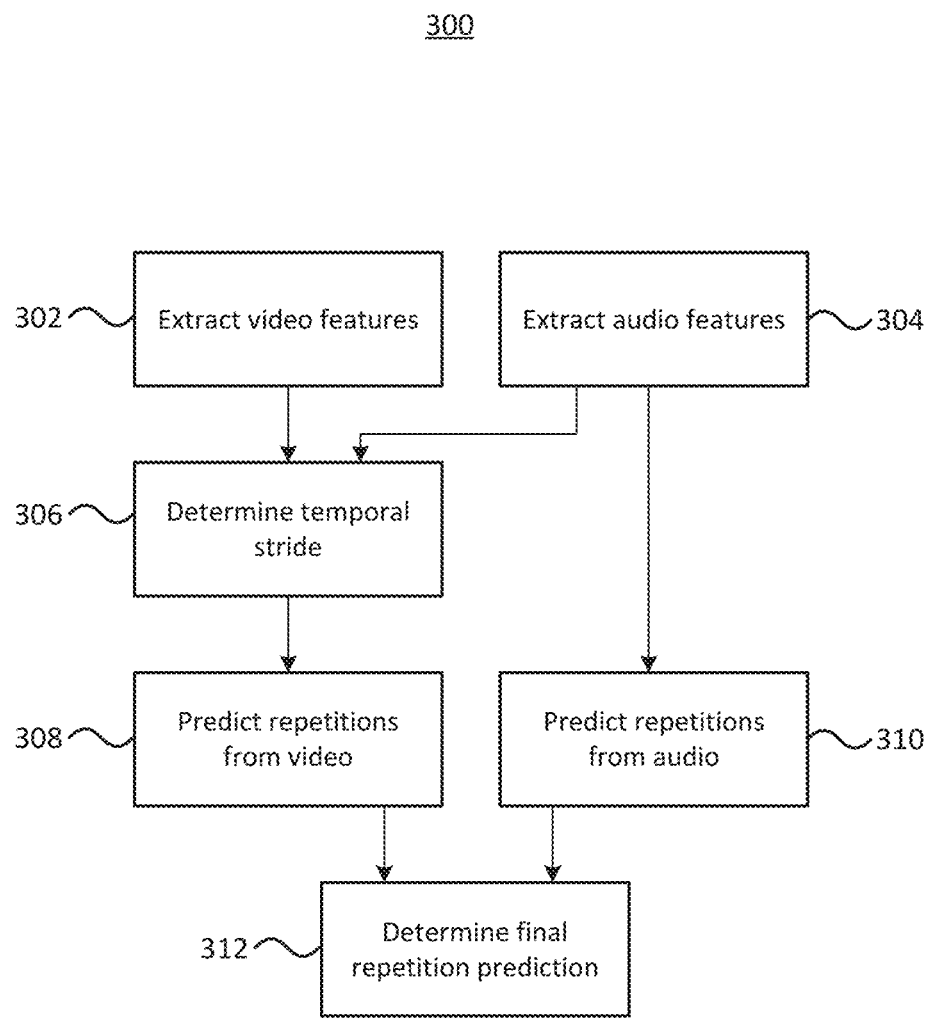
FIG. 3 depicts a system for automatic counting of repetitive activities using both audio and video.

FIG. 3 depicts a method for automatic counting of repetitive activities using both audio and video. The method 300 can be applied to audio video (AV) content in order to determine a number of repetitive activities captured in the AV content. The repetitive activity may include repetitions in both the audio and video portions. For example, in AV content of a person chopping an onion, the video portion may capture the repetitive activity of the knife chopping, and the audio portion may capture the corresponding repetitive sound of the chopping action. The method attempts to determine a count of the number of repetitive activities using both the sight and sound, i.e. the video and audio portions, of the AV content. It is possible that information useful in counting the repetitions may be blocked or obscured in parts of the AV content and so by using both the sight and sound to count repetitions may provide improved accuracy. The method extracts video features (302) from the video portions and extracts audio features from the audio portions (304). The video portions and the audio portions that are used to extract the respective features may be extracted directly from the respective portions of the AV content. Alternatively, it is possible for the respective audio and video portions to be processed prior to extracting the features. For example, the audio portion may be processed to provide a spectrogram corresponding to the audio portion, while the video may be decoded to provide a video clips in a particular format. The features may be extracted from both the audio and video portions using similar techniques. For example the features may be extracted based on residual neural networks, although other feature extraction techniques may be used. Further, multiple different features may be extracted from each of the audio and video portions. Different feature sets may be extracted in a similar manner, such as using respective residual blocks combined with global average pooling. For example, a first set of features may be extracted from both the audio and video portions that are used for a first purpose such as determining a temporal stride (306). The temporal stride is used in processing the video portion to count the number of repetitions. The temporal stride should be long enough that there is at least one repetition of the activity in the video portion. The determined temporal stride is used in processing the video portion, or more particularly determining a frame processing rate for the video portion. The video portion, or rather a set of features extracted from the video portion is processed to predict repetitions from the video (308). The prediction may be done using a neural network having one or more fully connected layers that output predictions on repetitive actions being present in the video. Similar to processing the video, the audio, or more particularly features extracted from the audio, is processed to predict repetitions from the audio (310). As with the video processing, the audio may be processed using a neural network comprising one or more fully connected layers that output a prediction of repetitive activities being present in the audio. Once the predictions are determined from the video and audio portions, a final repetition prediction is determined (312). The final prediction combines the audio and video predictions together. In a basic approach, the audio and video predictions could be averaged together to provide the final prediction. Alternatively, the audio and video portions, or rather the audio and video features may be processed in order to determine how best to combine the audio and video predictions. For example, the processing may determine that the audio predictions for a certain segment of the AV content are more reliable than the video, for example as a result of possible occlusions or other reasons, and so the audio should be relied upon for those portions.

Figure 4:
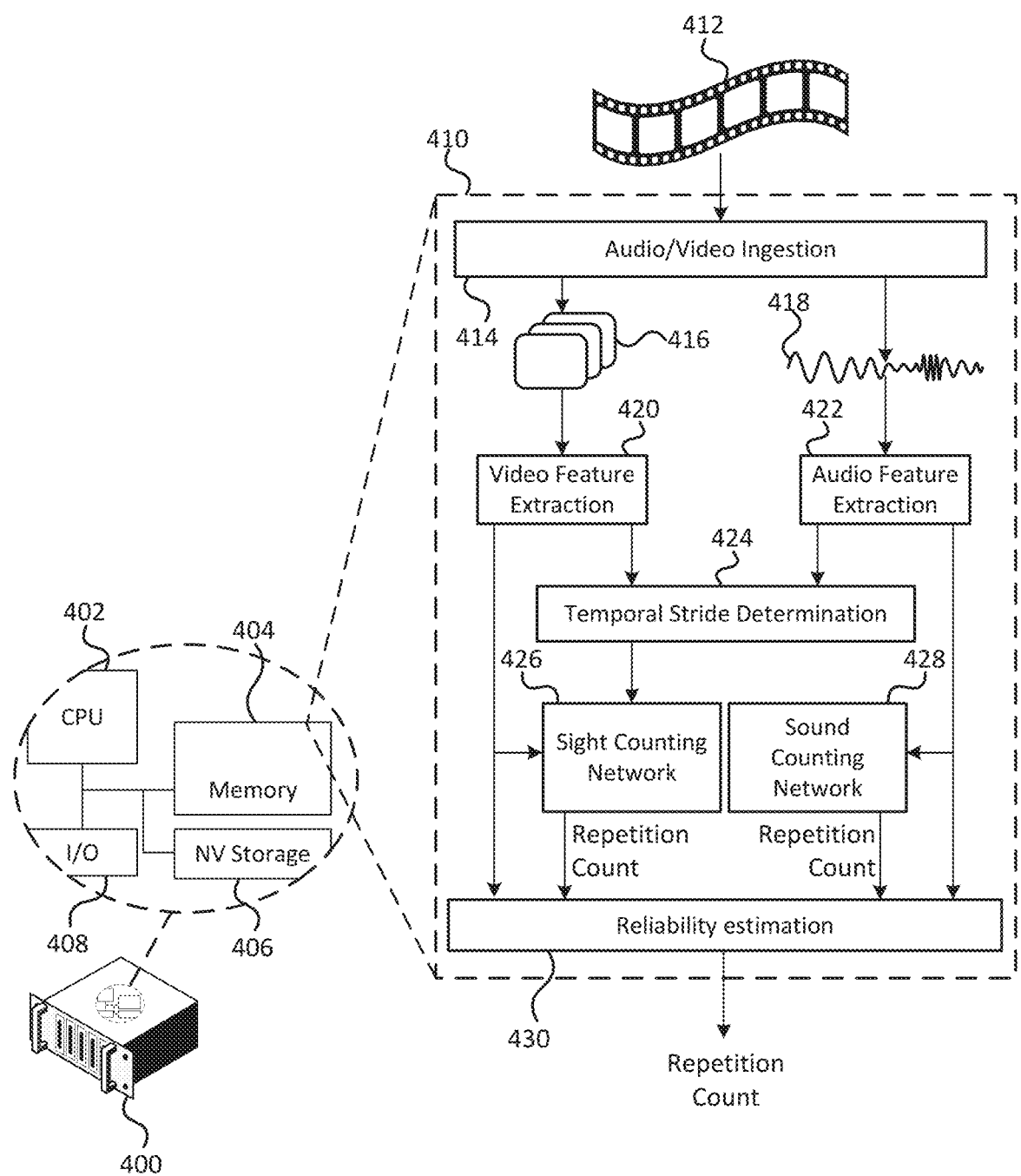
FIG. 4 depicts a method for automatic counting of repetitive activities using both audio and video.

FIG. 4 depicts a system for automatic counting of repetitive activities using both audio and video. The system 400 is depicted as a server, however the functionality described herein can be implemented on one or more servers or computer systems. The system 400 comprises at least one processing unit 402 for executing instructions. A memory unit 404 stores data and instructions that are executed by the processing unit 402. The memory unit 404 may provide volatile short term storage, however the system 400 may also include non-volatile storage 406 for additional storage. The system may include one or more input/output (I/O) interfaces 408 for connecting one or more additional components to the system 400. The instructions stored in the memory 404 can be executed by the processor 402 to provide various functionality 410 as described further below.

The functionality 410 provides various components for automatically counting a number of repetitive activities present in audio video content 412. The functionality 410 may include audio video ingestion functionality 414 that can receive AV content and generate corresponding video portions 416 and audio portions 418 that can be processed for counting the repetitive actions. The video portion 416 is processed by feature extraction functionality 420 which generates video features and the audio portion 418 is processed by feature extraction functionality 422 which generates audio features. The features may be provided as respective feature vectors or other possible structures. The feature extraction functionality 420, 422 may generate multiple sets of video and audio features for subsequent use by other functionality.

At least one set of respective audio and video features may be processed by temporal stride determination functionality 424, which determines a temporal stride for the video. Video features may then be processed according to the temporal stride by sight counting network functionality 426 that outputs an indication of the number of repetitive actions detected in the video. Audio features may be processed by sound counting network functionality 428 that outputs an indication of the number of repetitive actions detected in the audio. Reliability estimation functionality 430 may determine a final repetition count prediction from the audio and video repetition counts. The reliability estimation functionality may determine how to combine the audio and video repetition count by processing extracted audio and video features.

As described above, it is possible to count the number of repetitive actions present in AV content. The accuracy of the count may be improved by using both audio and video portions of the AV content. The AV content can be processed to determine a temporal stride for the video processing as well as to determine how to combine predicted results from the audio and video portions.

Experimental Setup

The techniques for counting repetitive activities described above was implemented and tested as described further below. Existing datasets for repetition counting focus on counting by visual content only. Consequently, the videos have either no audio information at all, or at best a few only. Nonetheless, the current sight stream model is tested on the two largest existing visual-only datasets. As the current model counts repetitions by sight and sound, an existing repetition counting dataset is re-purposed, reorganized and supplemented.

The UCFRep dataset contains 526 videos of 23 categories selected from UCF101 dataset, a widely used benchmark for action recognition, with 420 and 106 videos for training and validation. Particularly, it has boundary annotations for each repetition along the time dimension. However, the large majority of videos do not have any associated audio track.

The Countix dataset serves as the largest dataset for real world video repetition counting in the wild. It is a subset of the Kinetics dataset annotated with segments of repeated actions and corresponding counts. The dataset contains 8,757 videos in total from YouTube of 45 categories, with 4,588, 1,450 and 2,719 for training, validation and testing respectively.

The Countix dataset is repurposed and reorganized for the goal of counting repetitive activities by both sight and sound. First all the categories are checked and a total of 19 categories selected for which the repetitive action has a clear sound, such as playing table tennis, jumping jacks, bouncing ball, etc. Then, all videos are filtered out that do not contain an audio track or are full of background music instead of the original environmental sound, This results in the Countix-AV dataset consisting of 1,863 videos, with 987, 311 and 565 videos for training, validation and testing respectively. The original count annotations are maintained from Countix along with the same split (i.e. training, validation, or testing) for each video.

The audio signal is expected to play an important role when the visual content is not reliable. To allow for repetition counting in visually challenging environments, an Extreme Countix-AV dataset is introduced. Videos from Countix-AV are first selected that satisfy one of the following vision challenges: camera view changes, cluttered background, low illumination, fast motion, object disappearance, and scale variation. This results in a total of 156 videos. Then, this selection is enlarged by choosing another 58 videos from the VGGSound dataset that also satisfy one of the challenges above and overlap in terms of the 19 activity classes. The overall dataset is summarized in Table 1 below.

TABLE 1

| Vision challenge | Videos | Sight | Sound | Sight & Sound |
|---|---|---|---|---|
| Camera viewpoint changes | 69 | 0.384 | 0.376 | 0.331 |
| Cluttered background | 36 | 0.342 | 0.337 | 0.307 |
| Low illumination | 13 | 0.325 | 0.269 | 0.310 |
| Fast motion | 31 | 0.528 | 0.311 | 0.383 |
| Disappearing activity | 25 | 0.413 | 0.373 | 0.339 |
| Scale variation | 24 | 0.332 | 0.386 | 0.308 |
| Low resolution | 29 | 0.348 | 0.303 | 0.294 |
| Overall | 214 | 0.392 | 0.351 | 0.329 |

Evaluation Criteria

The same evaluation metrics are adopted as in previous works that use the mean absolute error (MAE) and off-by-one accuracy (OBO), which are defined as follows:

$$MAE = \frac{1}{N} \sum_{i=1}^{N} \frac{|\hat{c}_i - l_i|}{l_i}, \quad (12)$$

$$OBO = \frac{1}{N} \sum_{i=1}^{N} [|\hat{c}_i - l_i| \leq 1], \quad (13)$$

where N is the total number of videos, $\hat{c}_i$ is the model prediction of the ith video and $l_i$ is the groundtruth. For the Extreme Countix-AV only MAE is reported, as those videos have more repetitions than other datasets and OBO cannot evaluate the performance effectively.

Implementation Details

The model described above was implemented using Pytorch with two NVIDIA GTX1080Ti GPUs.

For the sight stream, all input video frames were resized to 112×112, and each video clip was constructed of 64 frames with its corresponding temporal stride S* as defined above. The backbone is initialized with weights from a Kinetics pre-trained checkpoint. The training of the sight model is on the original Countix training set and takes 8 epochs by SGD with a fixed learning rate of $10^{-4}$ and batch size of 8. $\lambda_v^1$, $\lambda_v^2$, $\lambda_a^1$, and $\lambda_a^2$ are all set to 10. The sound model is trained with the same setting as the sight stream but using the Countix-AV training set for 20 epochs in total.

The training of the temporal stride decision module used 5 epochs with a learning rate of $10^{-3}$ after the collection of training samples (as described above). Here, two options may be provided. First, it can be trained with the visual modality only, i.e. without the audio feature, using the original Countix dataset so that the sight model can work independently. The other option is the full setting (as shown in FIG. 2) trained on Countix-AV with the audio modality. Margin m in Eq. 8 is set to 2.9 and $S_K$ is set to 8. In experiments, the value of $\theta_s$ was found to not influence results too a great extent and $\theta_s=0.29$ worked best.

The training samples for the reliability estimation module, are first collected during the learning process of the sight and sound counting models (as described above) $\theta_r^v$ and $\theta_r^a$ are set to 0.36 and 0.40 respectively. Then, this module is trained on Countix-AV by 20 epochs with a learning rate of $10^{-4}$ and batch size of 8.

During inference, for each video, video clips are generated with temporal strides of $\{1, 2, \ldots, S_K\}$ and their corresponding audio signals. These video and audio clips are sent into the networks to find the best temporal stride. Then, the obtained stride is used to divide the whole video into video clips, which pass through the model to compute the final predictions. Here, $S_K$ is set to 5 in all experiments.

Experiments

Figure 5:
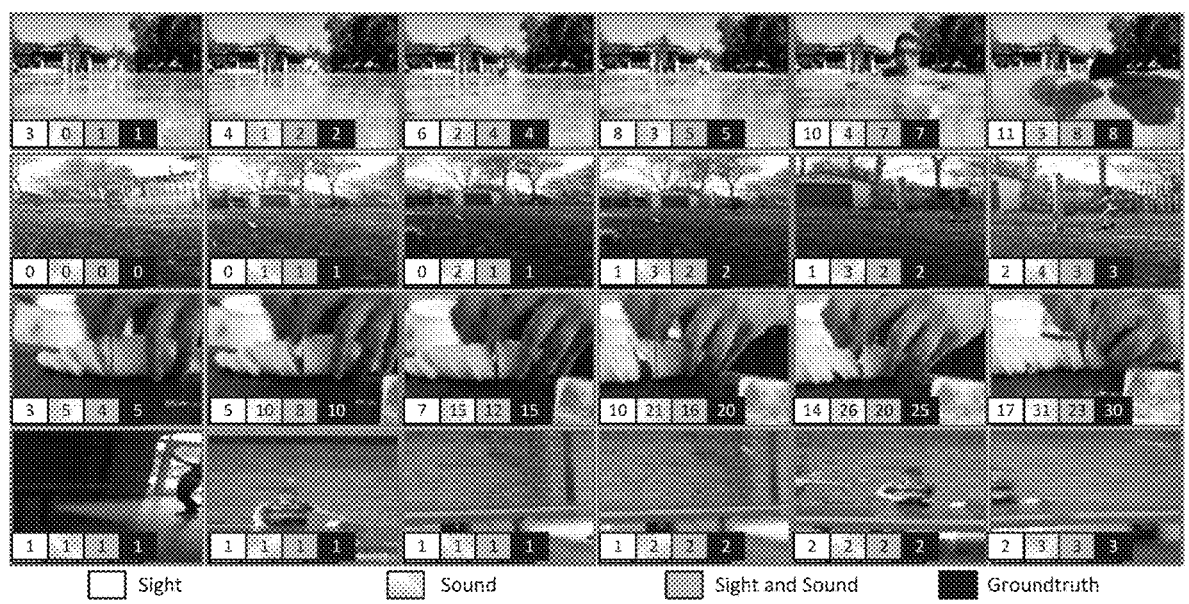
FIG. 5 depicts results of counting repetitive activities for different content.

FIG. 5 depicts qualitative results of the model processing the Extreme Countix-AV dataset. From the top to bottom rows are videos of scale variation, low resolution, fast motion and disappearing activity, with the numbers in boxes indicating the counting results for, sight only, sound only, sign and sound combined as the groundtruth.

The proposed model consists of four main components: the sight and sound counting models, the temporal stride decision module and the reliability estimation module. The performance of several network variants are evaluated on Countix-AV to validate the efficacy of each component. The results are shown in Table 2.

TABLE 2

| Model components | MAE↓ | OBO↑ |
|---|---|---|
| Sight stream | 0.331 | 0.431 |
| Sound stream | 0.375 | 0.377 |
| Sight and temporal stride | 0.314 | 0.459 |
| Averaging predictions | 0.300 | 0.439 |
| Full sight and sound model | 0.291 | 0.479 |

In isolation, the sight stream performs better than the sound stream. When audio features are incorporated into the temporal stride decision module, the MAE of the sight stream is further reduced from 0.331 to 0.314. This demonstrates the audio signals provides useful temporal information. Simply averaging the predictions from both modalities results in higher accuracy than either modality alone. However, when the predictions are further reweighed by the reliability estimation module the best results are obtained with an MAE of 0.291 and an OBO of 0.479.

The loss function used for training the visual and audio models consists of three terms. An ablation on different term combinations is performed to further understand their contribution. Results in Table 3 below indicate $L_{div}$ and $L_{mae}$ each reduce the counting error, especially on the sound stream. It is observed that adding $L_{div}$ leads to performance improvements because it allows the units in the classification layer to influence each other during training. It prevents the classification layer from converging to a degenerated solution, in which all videos are assigned to the same repetition class. Combining all loss terms during training leads to best results for both modalities.

TABLE 3

| Loss term | Sight | | Sound | |
|---|---|---|---|---|
| | MAE↓ | OBO↑ | MAE↓ | OBO↑ |
| $L_2$ | 0.371 | 0.424 | 0.471 | 0.338 |
| $L_2 + L_{div}$ | 0.324 | 0.478 | 0.410 | 0.343 |
| $L_{div} + L_{mae}$ | 0.356 | 0.446 | 0.447 | 0.310 |
| $L_2 + L_{mae}$ | 0.370 | 0.421 | 0.426 | 0.340 |
| $L_2 + L_{div} + L_{mae}$ | 0.314 | 0.498 | 0.375 | 0.377 |

Combining sight and sound is always better than sight only, resulting in considerable performance improvements on videos with camera view changes, disappearing activities, scale variation and cluttered background. For scale variation, the sound stream does not perform competitive compared to the visual stream. However, the fused results do improve over the sight stream. This again indicates the effectiveness of the reliability estimation module. For low illumination and fast motion, the sight stream performs relatively bad compared to the sound stream, and the combination cannot improve over the sound stream only. Overall, the integration of sight and sound is better than unimodal models and more stable when the imaging quality varies.

TABLE 4

| | UCFRep | | Countix | | Countix-AV | | Extreme Countix-AV |
|---|---|---|---|---|---|---|---|
| | MAE↓ | OBO↑ | MAE↓ | OBO↑ | MAE↓ | OBO↑ | MAE↓ |
| Baseline | 0.474 | 0.371 | 0.525 | 0.289 | 0.503 | 0.269 | 0.620 |
| Dwibedi et al. | — | — | 0.364 | 0.303 | — | — | — |
| Zhang et al. | 0.147 | 0.790 | — | — | — | — | — |
| Current (Sight) | 0.143 | 0.800 | 0.314 | 0.498 | 0.331 | 0.431 | 0.392 |
| Current (Sight & Sound) | — | — | — | — | 0.291 | 0.479 | 0.329 |

Figure 6:
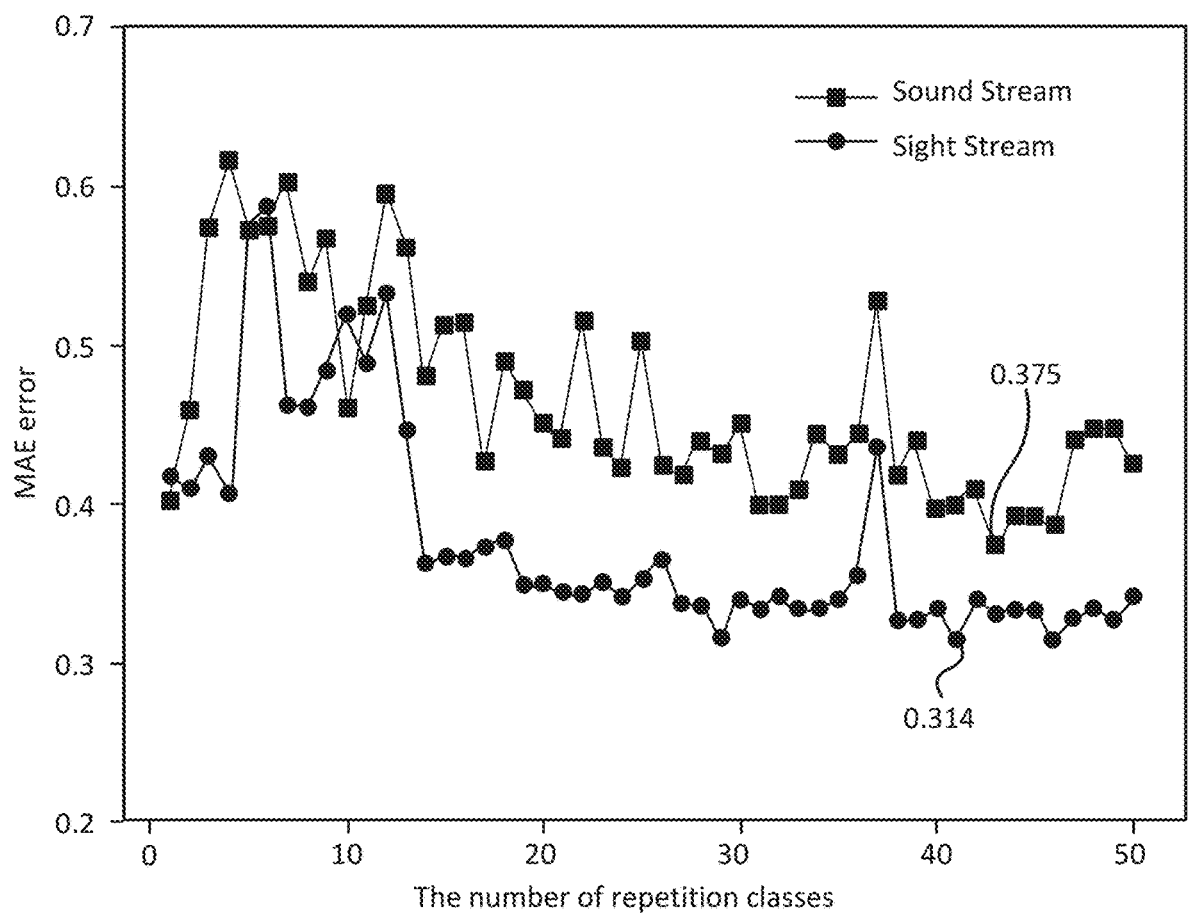
FIG. 6 depicts a graph of the effect of the number of repetition classes on the error.

As detailed in Eq. 2 and 3, the counting models for both modalities involve a parameter P, i.e. the number of repetition classes. The parameter's effect on both the sight and sound models was evaluated. To this end, the backbone architectures were fixed and trained by setting P from 1 to 50. Here, cross-modal features were not used, i.e. both models are trained and tested separately. The sight and sound models are trained and evaluated on Countix and the Countix-AV datasets, respectively. The results are illustrated in FIG. 6. The performances of both models are inferior when P has a low value, demonstrating the need to model various types of repetitions. The performance fluctuates only slightly when P is between 20 and 50. The sight and sound models obtain their best results at P=41 and P=43 respectively. Note that the Countix and Countix-AV datasets cover 45 and 19 action categories, so the repetition types do not simply correspond to the number of action categories. The need for higher P value for the sound stream may be explained by the observation that each action category may have different kinds of sound signals in practice. For example, in scenarios like playing tennis, the video camera may only record the sound of the actor that is close to it, while for some videos, the sounds of both actors are recorded. The sound model should distinguish between such situations and make the corresponding predictions. The P values are selected corresponding to the best performance of both modalities for the remaining experiments.

To further demonstrate the effectiveness of using sound information, the sight, sound and full sight and sound model were tested separately on the Extreme Countix-AV dataset. The results are shown in Table 4. Compared to the performance on the Countix-AV dataset, which is dominated by videos with normal sight conditions, the MAE of the sight stream increases significantly. In contrast, the performance of the sound stream remains stable and is superior under visually challenging circumstances as expected, except for the scale variation challenge. This means that a changes in image quality can easily affect the sight stream. Especially when activities are moving fast or disappearing due to occlusions, the value of the sound stream is prevalent.

The method described above is compared with two state-of-the-art (vision-only) repetition counting models, as shown above in Table 4. As the complete source code of the model presented in Dwibedi et al. is unavailable, the performance of the released (vision-only) model is provided as a baseline. The model presented in Zhang et al. needs the training videos to have boundary annotations, which are not provided in Countix dataset. Thus, only the performance presented in Zhang et al. on UCFRep are shown. The sight-only stream already outperforms Dwibedi et al. on the original Countix dataset with respect to both MAE and OBO metrics, and it achieves competitive performance on UCFRep dataset. The full sight and sound model described herein that counts repetitions by both sight and sound sets new state-of-the-art performance on both of the audiovisual datasets and surpasses the released model of previous work by a large margin. Experiments show that sound can play a vital role, and combining both sight and sound with modules exploiting their cross-modal temporal interaction is beneficial.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor to implement one, more or all of the steps of the described method or methods.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope.

What is claimed is:

1. A method for predicting a number of repetitions in an audio/video (AV) content comprising:
    extracting video features from a video portion of the AV content;
    extracting audio features from an audio portion of the AV content;
    processing at least a portion of the extracted video features and a portion of the extracted audio features to determine a temporal stride for use in processing the video portion of the AV content;
    processing the extracted video features with a neural network to predict a number of repetitive actions in the video portion based on the determined temporal stride;
    processing the extracted audio features with a neural network to predict a number of repetitive actions in the audio portion
    predicting a final number of repetitive actions from the predictions of the number of repetitive actions in the video portion and audio portion and the extracted video and audio features.

2. The method of claim 1, wherein the video portion of the AV content comprises a video clip from the AV content, and the audio portion of the AV content comprises a spectrogram of the AV content.

3. The method of claim 1, wherein the audio features are extracted using a 2D residual neural network.

4. The method of claim 3, wherein the residual neural network comprises at least 18 layers.

5. The method of claim 1, wherein the audio features are extracted using a 3D residual neural network.

6. The method of claim 1, wherein the neural network used to process the extracted video features comprises at least one fully connected layer.

7. The method of claim 6, wherein the neural network used to process the extracted video features comprises:
    a first fully connected layer outputting a repetition count of each of a plurality of repetition classes present in the video portion of the AV content; and
    a second fully connected layer classifying the plurality of repetition classes present in the video portion of the AV content.

8. The method of claim 1, wherein the neural network used to process the extracted audio features comprises at least one fully connected layer.

9. The method of claim 6, wherein the neural network used to process the extracted audio features comprises:
    a first fully connected layer outputting a repetition count of each of a plurality of repetition classes present in the audio portion of the AV content; and
    a second fully connected layer classifying the plurality of repetition classes present in the audio portion of the AV content.

10. The method of claim 9, wherein predicting the final number of repetitive actions comprises a residual block processing extracted audio features and a fully connected layer processing features output from the residual block and video features.

11. A non-transitory computer readable memory storing instructions, which when executed by a processor of a system configure the system to perform a method comprising:
    extracting video features from a video portion of the AV content;
    extracting audio features from an audio portion of the AV content;
    processing at least a portion of the extracted video features and a portion of the extracted audio features to determine a temporal stride for use in processing the video portion of the AV content;
    processing the extracted video features with a neural network to predict a number of repetitive actions in the video portion based on the determined temporal stride;
    processing the extracted audio features with a neural network to predict a number of repetitive actions in the audio portion
    predicting a final number of repetitive actions from the predictions of the number of repetitive actions in the video portion and audio portion and the extracted video and audio features.

12. The non-transitory computer readable memory of claim 11, wherein the video portion of the AV content comprises a video clip from the AV content, and the audio portion of the AV content comprises a spectrogram of the AV content.

13. The non-transitory computer readable memory of claim 11, wherein the audio features are extracted using a 2D residual neural network.

14. The non-transitory computer readable memory of claim 13, wherein the residual neural network comprises at least 18 layers.

15. The non-transitory computer readable memory of claim 11, wherein the audio features are extracted using a 3D residual neural network.

16. The non-transitory computer readable memory of claim 11, wherein the neural network used to process the extracted video features comprises at least one fully connected layer.

17. The non-transitory computer readable memory of claim 16, wherein the neural network used to process the extracted video features comprises:
   a first fully connected layer outputting a repetition count of each of a plurality of repetition classes present in the video portion of the AV content; and
   a second fully connected layer classifying the plurality of repetition classes present in the video portion of the AV content.

18. The non-transitory computer readable memory of claim 11, wherein the neural network used to process the extracted audio features comprises at least one fully connected layer.

19. The non-transitory computer readable memory of claim 16, wherein the neural network used to process the extracted audio features comprises:
   a first fully connected layer outputting a repetition count of each of a plurality of repetition classes present in the audio portion of the AV content; and
   a second fully connected layer classifying the plurality of repetition classes present in the audio portion of the AV content.

20. The non-transitory computer readable memory of claim 19, wherein predicting the final number of repetitive actions comprises a residual block processing extracted audio features and a fully connected layer processing features output from the residual block and video features.

21. A system comprising:
a processor for executing instructions; and
a memory storing instructions, which when executed by the processor configure the system to perform a method comprising:
   extracting video features from a video portion of the AV content;
   extracting audio features from an audio portion of the AV content;
   processing at least a portion of the extracted video features and a portion of the extracted audio features to determine a temporal stride for use in processing the video portion of the AV content;
   processing the extracted video features with a neural network to predict a number of repetitive actions in the video portion based on the determined temporal stride;
   processing the extracted audio features with a neural network to predict a number of repetitive actions in the audio portion
   predicting a final number of repetitive actions from the predictions of the number of repetitive actions in the video portion and audio portion and the extracted video and audio features.

* * * * *